United States Patent [19]

Rhoten

[11] Patent Number: 5,628,139
[45] Date of Patent: May 13, 1997

[54] ATTACHMENT FOR A FISHING LURE

[76] Inventor: Gregory D. Rhoten, 226 N. Linden Ave., Highland Springs, Va. 23075

[21] Appl. No.: 518,647

[22] Filed: Aug. 24, 1995

[51] Int. Cl.⁶ ..................................... A01K 85/10
[52] U.S. Cl. .............. 43/42.15; 43/42.38; 43/44.83
[58] Field of Search ................... 43/42.09, 42.11, 43/42.15, 42.18, 42.37, 42.38, 44.83

[56] References Cited

U.S. PATENT DOCUMENTS

| | | | |
|---|---|---|---|
| 2,472,505 | 6/1949 | Yocam et al. | 43/42.15 |
| 2,732,652 | 1/1956 | Parks | 43/44.83 |
| 2,814,086 | 11/1957 | Bahr | 43/44.83 X |
| 2,850,834 | 9/1958 | Parrish | 43/42.11 |
| 3,031,791 | 5/1962 | Banks | 43/42.39 |
| 3,293,791 | 12/1966 | Hinkson | 43/44.4 |
| 3,996,688 | 12/1976 | Hardwicke, III | 43/42.09 |
| 4,244,133 | 1/1981 | Martinek | 43/42.37 X |
| 4,962,610 | 10/1990 | Bleam et al. | 43/42.5 X |
| 5,009,025 | 4/1991 | Austad | 43/44.83 |
| 5,201,784 | 4/1993 | McWilliams | 43/42.11 X |
| 5,220,743 | 6/1993 | McClellan | 43/42.38 X |
| 5,379,543 | 1/1995 | Avent | 43/42.15 |

*Primary Examiner*—Joseph J. Hail, III
*Assistant Examiner*—Jay A. Stelacone
*Attorney, Agent, or Firm*—Norman B. Rainer

[57] ABSTRACT

A device for removably attaching a trailing spinner to a fish hook utilizes a rigidly spiraled wire which, when rotated about its axis embraces the shaft portion of the fish hook. The rearward or downstream extremity of the wire is bent to form a loop. A swivel mechanism having two in-line extremities engages at one extremity the loop of the wire. The opposite extremity of the swivel mechanism engages a connector that releasibly secures a spinner of single or multi-blade configuration.

10 Claims, 1 Drawing Sheet

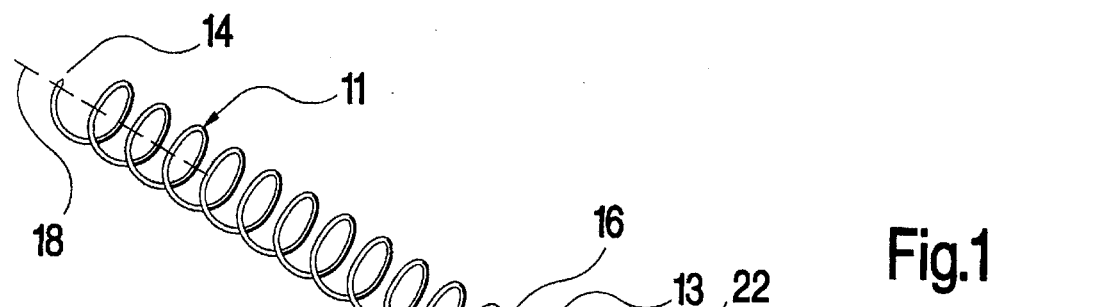
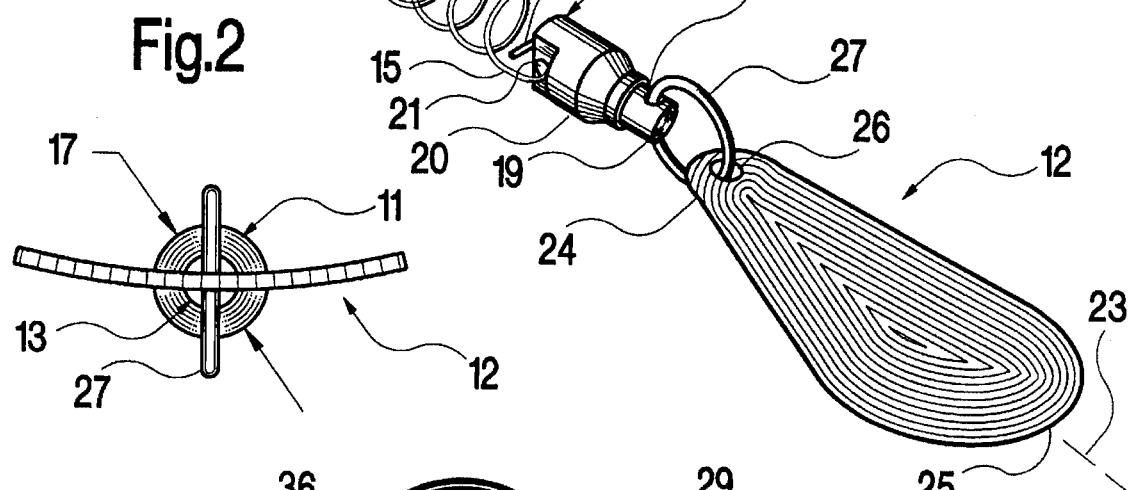
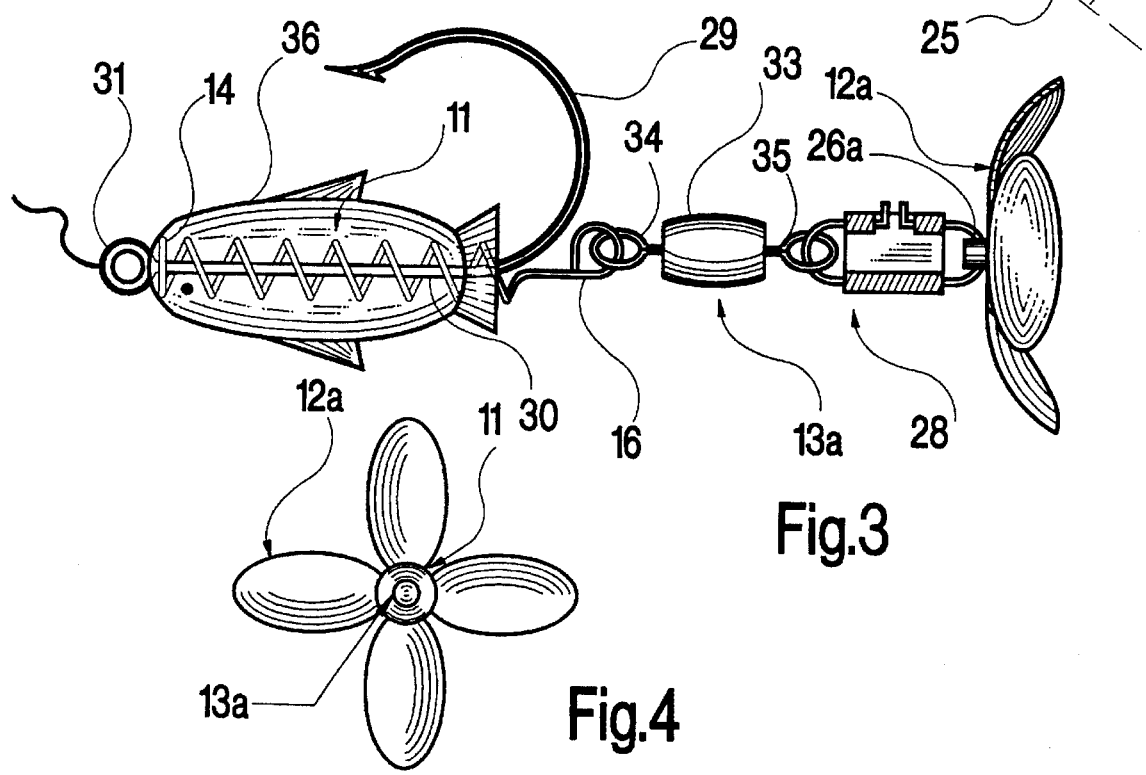

ATTACHMENT FOR A FISHING LURE

BACKGROUND OF THE INVENTION

1. Field of the Invention

This invention relates to hook-and-line fishing, and more particularly concerns a removable attachment that attracts fish to a fish hook.

2. Description of the Prior Art

In hook-and-line fishing, a fish is lured to bite on a hook either because of a bait emplaced upon the hook, or because of other, non-bait stimuli involving visual, olfactory or auditory factors. The hook is comprised of an attachment eye, a shank portion, and a curved portion that terminates in a barbed tip.

Visual attractive factors include: 1) an appearance resembling a naturally occurring food, 2) rapid movement, and 3) bright, flashing objects. Spinner or spoon devices are very effective components of fishing lures because they produce rapid movement and bright flashing effects. Spinners can further produce a vibration that serves as an auditory stimulus. Certain spinners precede the fish hook whereas other spinners, known as trailing spinners, are positioned rearwardly of the hook.

Fishing lures equipped with various types of spinner devices are disclosed, for example, in U.S. Pat. Nos. 3,918,192, 5,203,105 and 5,412,900. Although the spinner device is usually incorporated into the lure during the manufacture of the lure, and is not removable therefrom, certain spinner devices have been designed as components which can be attached to a hook, a line, or an existing lure. However, such add-on components often adversely affect the functionality of a lure. Also, it has not hitherto been possible to add a trailing spinner to a treble hook or a hook having a rubbery attractive object molded thereupon.

In various fishing situations, experienced fishermen prefer to modify their lures so as to enhance their success. The modifications are usually expedients that may be easily and quickly accomplished without special tools, and preferably without producing permanent damage to an existing lure. Commonly available spinner devices which are of an attachable nature do not afford to the fisherman the versatility he seeks without the aforesaid disadvantages.

It is accordingly an object of the present invention to provide a device for removably attaching a trailing spinner to a fish hook.

It is another object of this invention to provide a device as in the foregoing object which is installable upon the shank portion of a fish hook without need of any tools.

It is a further object of the present invention to provide a device of the aforesaid nature of simple, rugged design amenable to low cost manufacture.

These objects and other objects and advantages of the invention will be apparent from the following description.

SUMMARY OF THE INVENTION

The above and other beneficial objects and advantages are accomplished in accordance with the present invention by a device for attachment to the shank portion of a fish hook comprising:

a) a spiraled wire having a forward extremity and a rearward extremity having a securement loop, b) a swivel mechanism having an upstream extremity provided with a first aperture engaged by said loop, and a downstream extremity having a second aperture, c) a trailing spinner having front and rear extremities, and d) connector means for releasibly joining the front extremity of said spinner to the second aperture of said swivel mechanism.

In preferred embodiments, the spiraled wire is a helix having a constant diameter, said diameter being between about 2 and 7 millimeters. The length of the helix may range from 10 mm. to 60 mm.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a perspective side view of an embodiment of the device of the present invention.

FIG. 2 is an enlarged rear end view of the device of FIG. 1.

FIG. 3 is a side view of an alternative embodiment of the device shown emplaced upon a fish hook.

FIG. 4 is a front end view of the device of FIG. 3.

DESCRIPTION OF THE PREFERRED EMBODIMENT

Referring to FIGS. 1–3, embodiments of the device 10 of the present invention are shown comprised of spiraled wire 11, spinner 12, 12a and intervening swivel mechanism 13, 13a.

Said spiraled wire has a forward extremity 14 and rearward extremity 15 bent into a closed securement loop 16. The spiraled wire is configured as a helix having a constant diameter 17 and a uniform pitch or winding frequency. Said diameter is between about 2 and 7 millimeters. The length of the helix may range from 10 mm. to 60 mm. and may possess between 5 and 20 windings or revolutions. The thickness of the wire, and the nature of the metal from which it is fabricated is such that, torque applied about the axis of elongation 18 at rearward extremity 15 is completely transmitted to forward extremity 14. There is no tendency for the helical configuration to unwind, as for example in spring structures, when torque is applied to one extremity. Accordingly, the spiraled wire may be characterized as a rigid helical coil, even though it has resiliency in a direction transverse to axis 18.

Swivel mechanism 13 is comprised of an upstream extremity component 20 having first aperture 21 that is engaged by loop 16, and a downstream extremity component 19 having second aperture 22 rotatively joined to upstream component 20. The construction of the swivel mechanism of FIG. 1 is such that upstream component 20 is fixed, and downstream component 21 rotates with respect to said upstream component about the axis of elongation of said swivel mechanism. The swivel mechanism of FIG. 3 comprises a hollow central housing 33 which rotatably secures upstream and downstream arms 34 and 35 respectively, said upstream arm engaging loop 16.

The spinner may be of single-bladed construction 12, as shown in FIG. 1, or of multi-bladed construction 12a, as the propeller design shown in FIGS. 3 and 4. The single-bladed spinner is elongated upon a center axis of symmetry 23 between front and rear extremities 24 and 25, respectively, said front extremity having aperture 26. Connector means in the form of split ring fastener 27 may be utilized to engage apertures 22 and 26, thereby achieving removable attachment of said spinner to said swivel mechanism. In the alternative embodiment shown in FIG. 3, a double-ended safety pin type connector 28 is employed instead of split ring 27 to removably connect the spinner to the swivel mechanism.

When attaching the device of this invention to a fish hook 29, the forward extremity 14 of the spiraled wire is entered onto the shank portion 30 of said fish hook. The spiraled wire is then rotated, causing it to self-feed onto shank portion 30. Said forward extremity will either come to rest in abutment with the eye 31 of the fish hook, or may actually enter said eye. The twist direction of the spiraled wire is preferably in the same direction as the rotational direction produced by the spinner when it is pulled through the water. Such matching of components assures that the device of this invention will not dislodge from the hook during use.

In a preferred embodiment, forward extremity 14 is sharpened sufficiently to enable the spiraled wire to threadably penetrate a rubbery lure object 36 molded onto the shank of the fish hook. Such manner of installation is possible only by virtue of the rigid nature of the spiraled wire in concert with said sharpened forward extremity.

Following use on a given fish hook, the device can be removed merely by rotating the spiraled wire in the reverse direction. Different sizes of the device, particularly the spiraled wire component, may be used in a manner to associate with hooks and/or lures of varied size and configuration.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A device for attachment to a shank portion of a fish hook comprising:
   a) a spiraled wire having a forward extremity, and a rearward extremity having a securement loop, said spiraled wire being a helix having a constant diameter of between 2 and 7 millimeters, a uniform winding frequency, a length between 10 and 60 millimeters, and between 5 and 20 windings,
   b) a swivel mechanism having an upstream extremity provided with a first aperture engaged by said loop, and a downstream extremity having a second aperture,
   c) a trailing spinner having front and rear extremities, and
   d) connector means for releasibly joining the front extremity of said spinner to the second aperture of said swivel mechanism.

2. The device of claim 1 wherein said spinner is of single-bladed construction having a center line of symmetry.

3. The device of claim 1 wherein said spinner has an aperture disposed adjacent said front extremity on said line of symmetry.

4. The device of claim 1 wherein said connector means is a split ring fastener.

5. The device of claim 1 wherein said connector means is a double-ended safety pin type connector.

6. The device of claim 1 wherein the forward extremity of said spiraled wire is sharpened.

7. The device of claim 1 wherein said spiraled wire has a center axis of elongation and a twist direction whereby rotation of said wire about said axis enables said wire to self-feed onto and engage said shank portion.

8. The device of claim 7 wherein said twist direction is the same direction as the direction of rotation produced by said spinner when pulled through water.

9. The combination of a fish hook having a shank portion and a device removably attached to said shank portion, said device comprising:
   a) a spiraled wire having a forward extremity, and a rearward extremity having a securement loop, said spiraled wire being a helix having a constant diameter of between 2 and 7 millimeters, a uniform winding frequency, a length between 10 and 60 millimeters, and having between 5 and 20 windings,
   b) a swivel mechanism having an upstream extremity provided with a first aperture engaged by said loop, and a downstream extremity having a second aperture,
   c) a trailing spinner having front and rear extremities and
   d) connector means for releasibly joining the front extremity of said spinner to the second aperture of said swivel mechanism.

10. The combination of claim 9 further comprising a rubbery lure.

* * * * *